United States Patent [19]

Venturelli

[11] Patent Number: 5,782,336
[45] Date of Patent: Jul. 21, 1998

[54] APPARATUS FOR HANGING OBJECTS IN AN ORDERLY FASHION, ESPECIALLY SACKED MEATS, ON TRANSFERABLE SUPPORTS

[75] Inventor: Rino Venturelli, Savignano Sul Panaro, Italy

[73] Assignee: Tecnomec S.r.L., Vignola, Italy

[21] Appl. No.: 596,443

[22] Filed: Feb. 2, 1996

[30] Foreign Application Priority Data

Feb. 17, 1995 [IT] Italy ................... MO95A0022

[51] Int. Cl.⁶ ............... A22C 15/00; B65G 47/61
[52] U.S. Cl. ................................... 198/465.4
[58] Field of Search ................ 198/465.4, 485.1, 198/486.1, 687.1, 681

[56] References Cited

U.S. PATENT DOCUMENTS

| | | |
|---|---|---|
| 570,025 | 10/1896 | Kennedy et al. ............ 198/465.4 X |
| 2,752,883 | 7/1956 | Curtis ........................ 198/465.4 X |
| 3,533,495 | 10/1970 | Wallace ..................... 198/486.1 X |
| 4,953,495 | 9/1990 | Salisbury .................. 198/486.1 X |
| 5,261,520 | 11/1993 | Duke ......................... 198/465.4 X |

FOREIGN PATENT DOCUMENTS

| | | |
|---|---|---|
| 0417451 | 3/1991 | European Pat. Off. . |
| 0424675 | 5/1991 | European Pat. Off. . |
| 2619285 | 2/1989 | France . |
| 3437830 | 4/1986 | Germany . |
| 9203929 | 3/1992 | WIPO . |

Primary Examiner—David A. Bucci
Attorney, Agent, or Firm—Browdy and Neimark

[57] ABSTRACT

The objects, hanging from hooks, are transferred on to a transport line below a tract of same on which is positioned a straight-rod support supported at an end thereof by pliers, which are located at a predetermined distance one from another and activated alternatingly to grip a same end of the support in synchrony with the passage of a single hook along the transport line. The location of the objects on the support is operated by a tilting device producing, on command, a partial tilting of the hook on which the object is hung.

7 Claims, 4 Drawing Sheets

APPARATUS FOR HANGING OBJECTS IN AN ORDERLY FASHION, ESPECIALLY SACKED MEATS, ON TRANSFERABLE SUPPORTS

BACKGROUND OF THE INVENTION

The invention relates to an apparatus for hanging objects in an orderly fashion, especially sacked meats, on transferable supports.

The prior art teaches the method of hanging sacked meats on rods which are then moved and located on special trucks or in chambers so that operations such as seasoning (or other operations which are part of the working progress of the meats) can take place.

The hanging operation, using the loop provided on the sacks, on to the support and spacing the sacks on the rod according to their size and dimensions, is at present performed manually. This leads to the drawback of requiring a considerable amount of work time and labour effort.

SUMMARY OF THE INVENTION

The present invention, as it is characterized in the claims that follow, proposes to obviate the limitations and drawbacks of the prior art by providing an apparatus for orderedly hanging objects, especially sacked meats, on transferable supports, which apparatus is easily and simply insertable into the normal working cycle of the meats.

An advantage of the invention is that it works very quickly and most precisely.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which.

DESCRIPTION OF THE PREFERRED EMBODIMENTS

Figure 1:
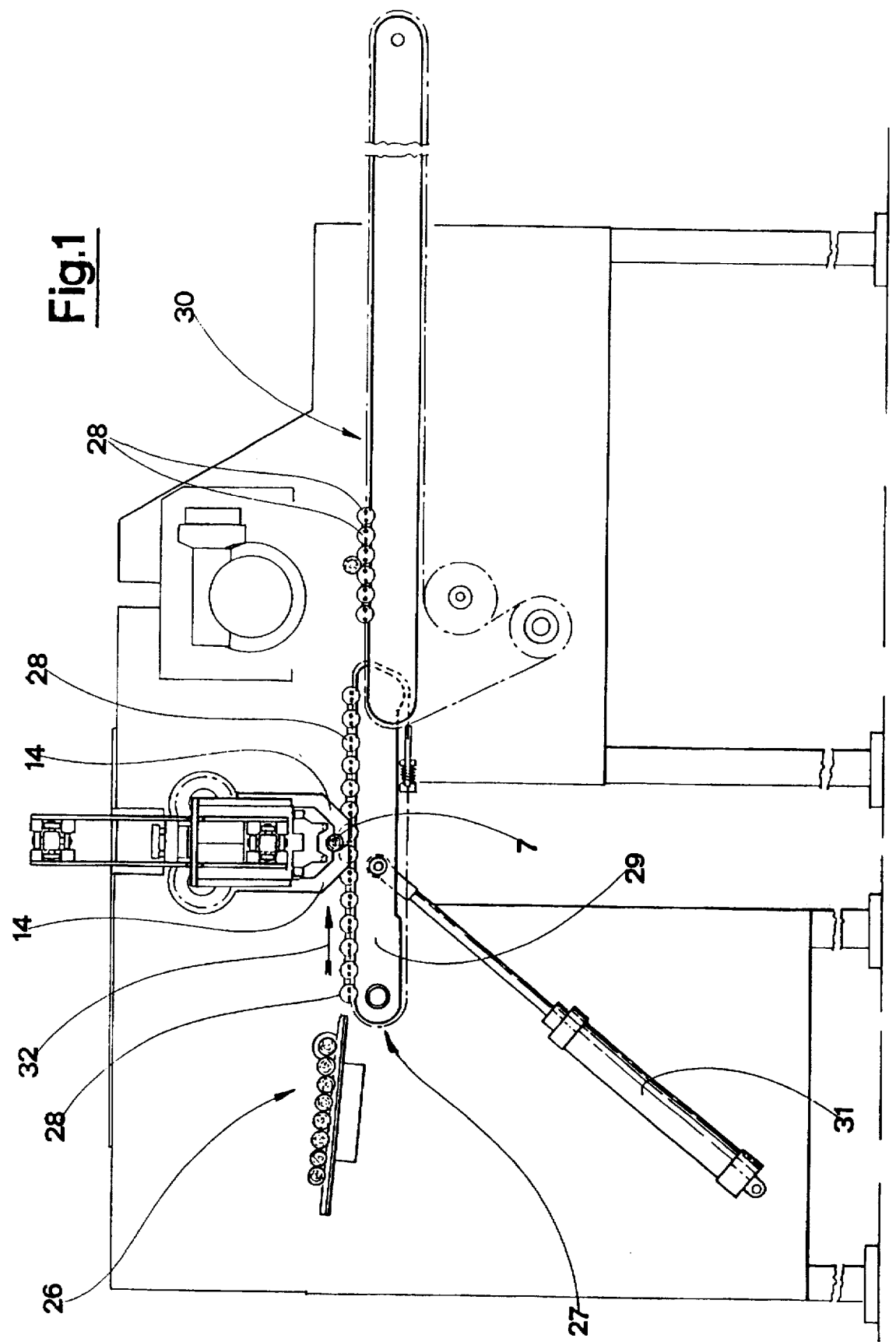
FIG. 1 shows a schematic frontal view.
Figure 2:
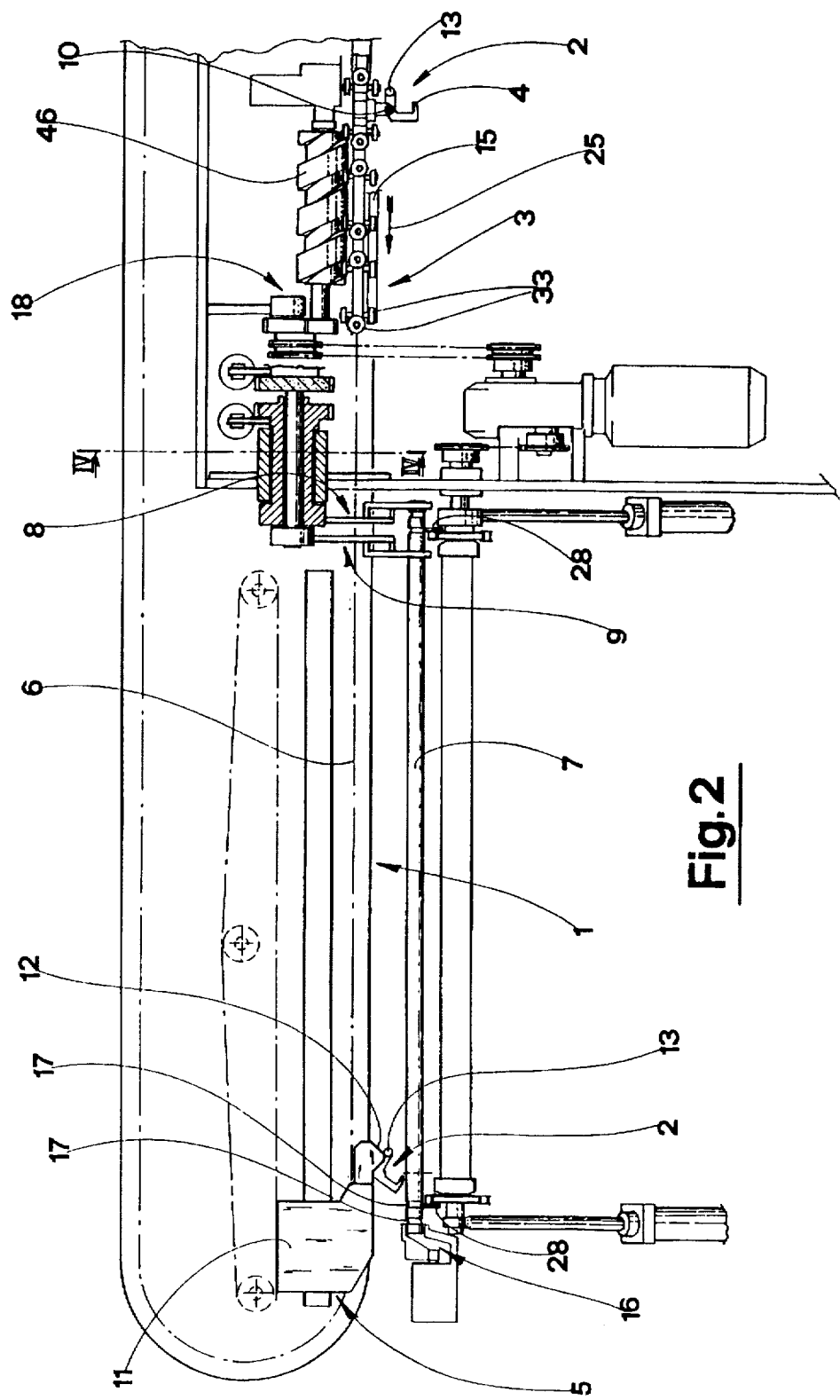
FIG. 2 shows a schematic lateral view, partially sectioned, of FIG. 1.
Figure 3:
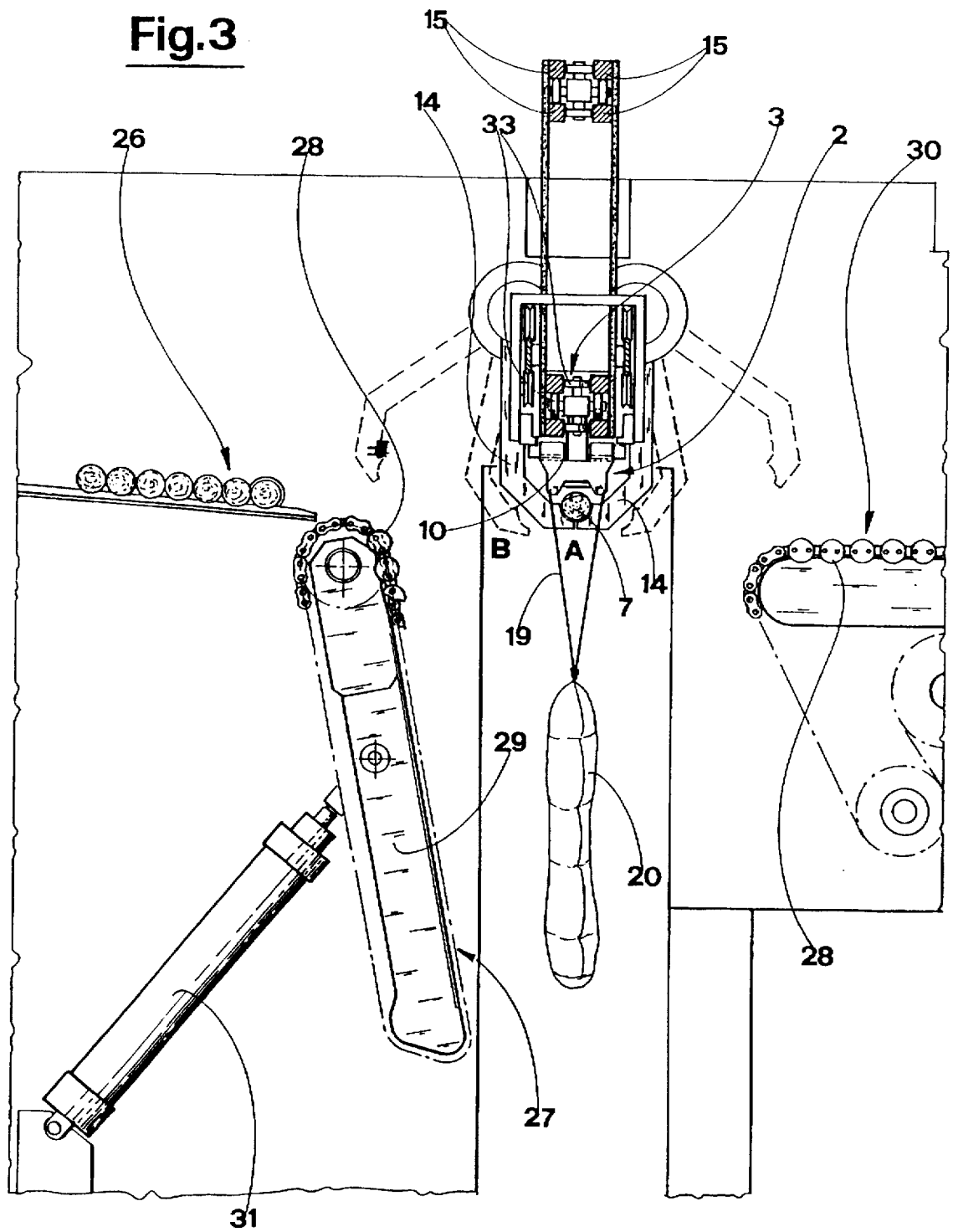
FIG. 3 shows, in enlarged scale, a part of FIG. 2 in a different operative configuration.
Figure 4:
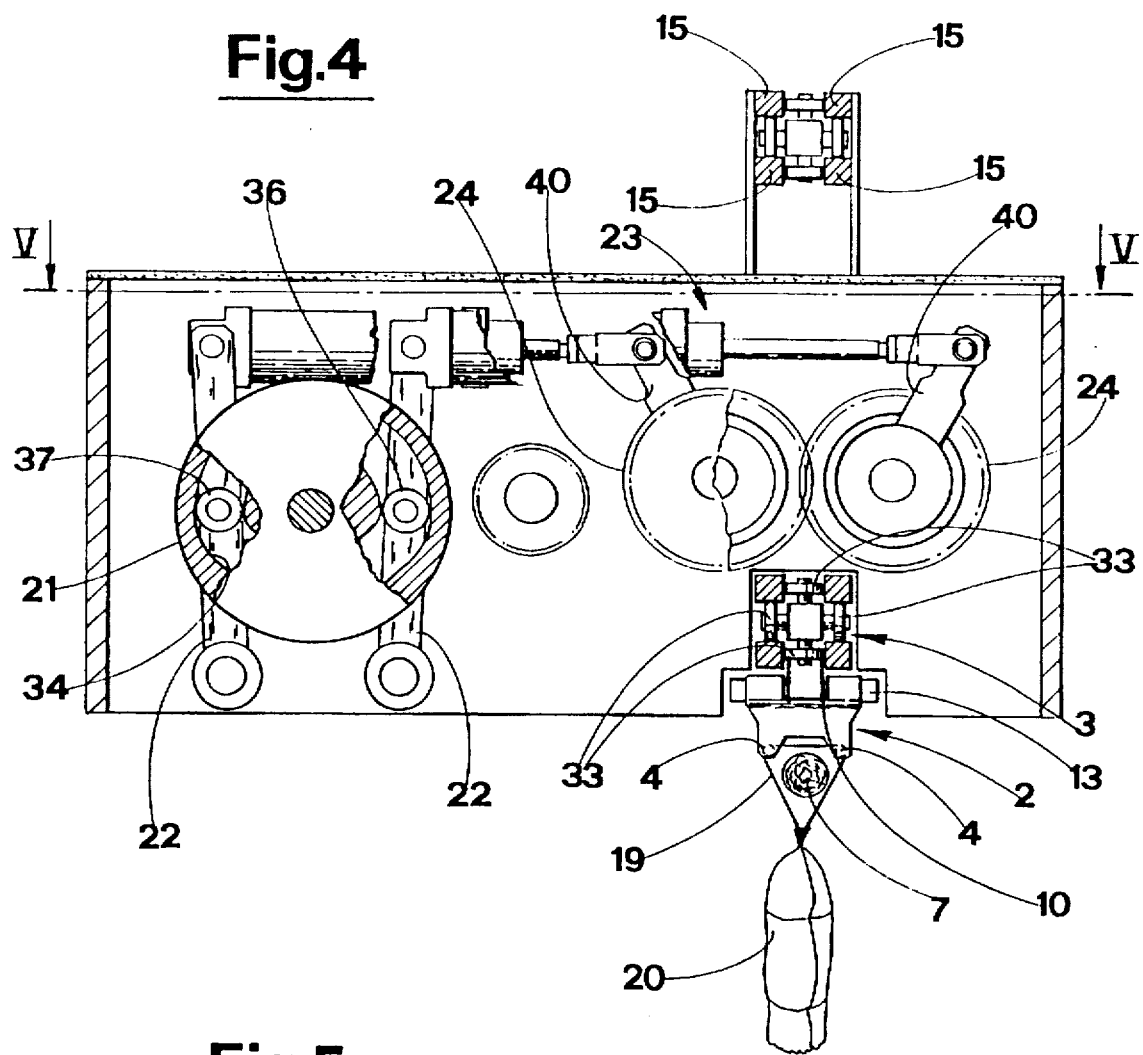
FIG. 4 shows, in enlarged scale, part of a schematic section made according to line IV—IV of FIG. 2.
Figure 5:
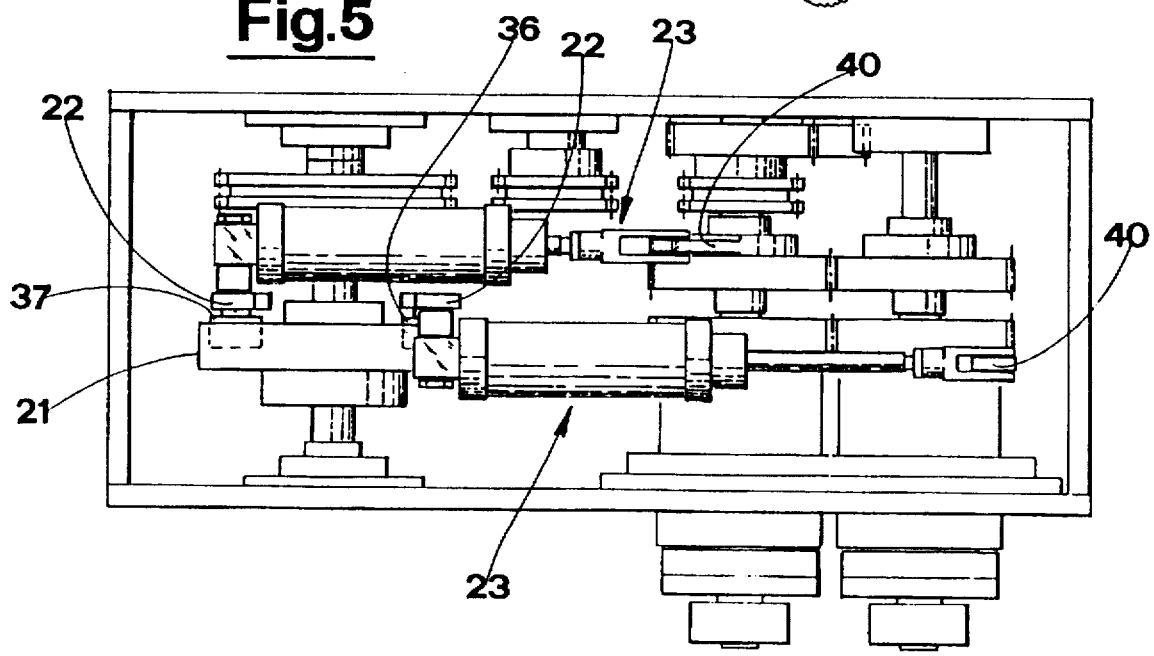
FIG. 5 shows a schematic section made according to line V—V of FIG. 4.

With reference to the figures, 1 denotes in its entirety a transport line along which fork-hooks are caused to advance. The hooks 2 are constrained to a chain 3 and are arranged consecutively one after another at a predetermined reciprocal distance.

The chain 3 is constituted by a cardan chain, provided with pairs of guide wheels 33 each arranged with an axis orthogonal to another and to the advancement direction of the chain.

The guide wheels 33 are uniformly distanced in a longitudinal direction of the chain 3, as are the hooks 2.

In particular, the hooks 2 are pivoted in the chain 3 links by means of pivots 10 having axes perpendicular to the chain advancement direction along the line 1. The line 1 is represented by a straight horizontal line in the figures, where the chain 3 is guided by a plurality of straight horizontal guides 15. By means of the straight horizontal guides 15 the chain 3 is kept constantly oriented so that the pivots 10 are always arranged with their axes parallel, horizontal and perpendicular to the direction of advancement of the chain 3.

The hooks 2 are symmetrically structured and exhibit two teeth 4 positioned at a predetermined distance one from the other, which teeth 4 are destined to receive the loop 19 of an object to be hung, precisely in the present case a sacked meat product 20. The hooks 2 are further provided, in an opposite position with respect to the pivots 10, with pins 13 having a function of interacting with a device 5 for producing, on command, a partial tilting of the hooks 2 about the pivots 10. The device 5 comprises a shuttle 11 constrained to a device 5 of known type which causes the shuttle 11 to position itself along a straight guide 6 disposed parallel to the straight horizontal guides 15. The shuttle 11 is provided with a shaped appendage 12 predisposed to interact with the pins 13 of the hooks. The shaped appendage 12, acting together with the pins 13 of a hook 2, produces a partial rotation of the hook 2 about the pivot 10, bringing the hook 2 into a position at which the teeth 4 are inclinedly disposed in a downwards direction. Obviously in this position the teeth 4 would not be able to receive and hold a loop 19 previously attached thereon. In the normal position, the teeth 4 are arranged horizontally or slightly upwards-turned so that they can in fact hold on to a loop 19.

The possibility of locating the device 5 at any point along the guide 6 enables (at a predetermined point) a hook 2 carrying an object by its loop 19 to be unloaded. The hooks 2 are forked so that the loop 19 hooked thereon are kept open in order that same can be transferred on to a support 7, precisely a rod of the type utilized for orderedly hanging sacked meat products 20. A support 7 is predisposed and supported at both ends below the straight tract of the transport line 1 so that the loop 19 of the hung sacked meat hanging from a hook 2 and transiting along said line 1 is brought into a position where it is met by the support 7. For this purpose, the two teeth 4 of each hook 2 are positioned at a reciprocal distance which is greater than the maximum dimension (ie. the diameter) of the support 7.

The supports 7 are automatically loaded, positioned below the line 1 and removed therefrom, once loaded with the sacked meat product 20, by a group comprising a feeder 26 of the unloaded supports 7, a first pair of chain conveyors 27, rotatable about a fixed axis parallel to the advancement direction of the hooks 2, and a second pair of chain conveyors 30 activated synchronically and predisposed with respect to the first pair of chain conveyors 27 in such a way as to constitute a continuation thereof.

The feeder 26 is schematically composed of an inclined plane along which the supports 7 are predisposed side-by-side and from which they are released one at a time then to be deposited on the first pair of chain conveyors 27. The two chain conveyors 27 are synchronically activated and each exhibit a ring-wound chain associated to disks 28 consecutively arranged such that between one disk 28 and a next a sort of cavity wherein the support 7 (which is cylindrical) can rest. For this purpose each support 7 is provided at either end with two specially distanced channels 17. In particular, in the illustrated embodiment the two externalmost channels 17 are located at a reciprocal distance which permits them to insert contactingly into the disks 28 of the two chain conveyors 27. Each of the two chain conveyors 27 exhibits a frame 29 which can be commanded to rotate in two directions about a fixed axis perpendicular to the transport direction between a horizontal work position and an inactive position at which the transporter is predisposed with the unloading end downwards so as not to interfere with the sacked meat products 20 hung and moving in a parallel direction to that of the transport line 1. The passage from one position to another of the single chain conveyors 27 is realized by means of a cylinder 31. The movement of the upper branches of the chain conveyors 27 in the direction indicated by the arrow 32 produces a displacement of the single supports 7, supplied by the feeder 26 below the transport line 1 along which the hooks 2 transit. A second pair of chain conveyors 30 receive the loaded supports 7 from the chain conveyors 27 and transfer same to a subsequent phase of the work cycle. The chain conveyors 30 are also associated with relative disks 28 predisposed consecutively in such a way that the ends of the single supports 7, unloaded from the first chain conveyors 27, can rest in the cavity identified by two consecutive disks 28. For this purpose, the supports 7 are provided with a second pair of channels 17 arranged at a reciprocal distance, which is equal to the distance between the disks 28 associated to the chains of the second pair of chain conveyors 30.

The presence of the channels 17 has the aim of preventing the supports 7 from moving in a perpendicular direction to the advancement direction.

Exactly below the transport line 1 and at a side thereof is located a gripping organ 16 having the task of positioning and securing an end of the support 7, and at another side thereof are positioned two pliers 8 and 9 which alternatingly grip the other end of the support 7 by means of a mechanism operating in synchrony with the advancement of the single hooks 2 along the line 1. In particular, the two pliers 8 and 9 are located at a reciprocal distance not less than the size of the mass, in the advancement direction, of a single hook 2, and are both constituted by symmetrically-opening arms 14 provided with shaped impressions for embracing the end of the supports 7.

The mechanism operating in synchrony with the advancement of the single hooks 2 along the line 1 comprises a rotating organ 46 for the movement of the chain 3 which, in the illustrated embodiment, is constituted by a screw having a helicoid channel, in other words a thread, in which the upper wheels 33 of the chain 3 engage. Thus the rotation of the organ 46 produces, by effect of the coupling of the wheels 3 in the helicoid channel provided in the organ 46, the advancement of the chain in the direction indicated by arrow 25.

A mechanical transmission 18 transmits (with a predetermined gear ratio) the rotation of the rotating organ 46 to a cam 21 commanding the alternated activation of the pliers 8 and 9 synchronically with the transit of the hooks 2 between the organs. The cam 21 is provided with a channel 34 in which the pivots 36 and 37 of two rocker arms 22 engage, said rocker arms 22 having their other two ends hinged to two con rods 23. Each of the con rods 23 is constrained at another end thereof to an appendage 40 in turn solidly constrained to one of the two arms 14 provided on each plier 8 and 9. The two arms 14 of each plier are journalled about two fixed axes parallel to the advancement direction of the chain 3 and are reciprocally constrained to rotate equally and in opposite directions by two identical gear wheels 24 reciprocally enmeshed and fixed one to an arm 14 and the other to the other arm 14 of the arm pair.

The above-described mechanism permits production, through the rotation of the cam 21, the alternated opening of the pliers 8 and 9 in such a way that when one of the two said pliers 8 and 9 is open, the other is closed. This results in a condition where the support 7 is always supported at the second end thereof. In particular, the synchronization is regulated so that when a hook 2 nears the plier 8 said plier 8 opens with a movement of the arms 14 from a closed position A to an open position B, while plier 9 remains closed (with arms 14 in position A). The cam 21 is designed so that as soon as the hook 2 is moved internalwise between the two pliers 8 and 9, plier 8 closes bringing the arms 14 into position A and plier 9 opens, bringing the arms 14 into position B. In this way, the support 7 does not remain without a rest when the hook 2 is receiving. Once the hook 2 has passed on from the plier 9, said plier 9 is closed bringing its arms 14 from position B into position A.

The hook 2 is thus free to transit along the whole length of the support 9 up until when it meets the tilting device 5, which unloads the sacked meat products 20 by unhooking the loop 19 from the support 7. To enable a larger opening of the arms 19, during the phase when the whole support 7 is transferred, the con rods 23 exhibits a command-variable length. The con rods 23 are constituted by pneumatic cylinders which are actuated on command in synchrony with the transfer movement of a single support 7 towards and from the loading position below the transport line 1.

What is claimed:

1. An apparatus for hanging objects in an orderly fashion, especially sacked meats, on transferable supports, comprising:

a transport line along which fork-shaped hooks are guided, which hooks are consecutively constrained to a chain at a first predetermined reciprocal distance;

a tilting device for producing on command a partial tilting of said hooks from a natural loaded position, at which teeth of said hooks are positioned in such a way as to keep said object stably hung, into an unloading position, in which said teeth of said hooks are arranged inclinedly downwards such as to be unable to keep an object hooked thereon;

said tilting device being positionable on command at any point of a guide predisposed parallel to a tract of the transport line of the hooks;

a straight-rod support predisposed such that said objects can be hung thereon, the support having ends;

means for supporting said support at both ends thereof while keeping said support in a position which is parallel to and below said transport line of said hooks; said means for supporting comprising a first plier and a second plier situated and predisposed to operate at least at one end of said support, said first plier and said second plier being arranged at a second predetermined reciprocal distance and being commanded by a commanding means to alternatingly grip said at least one end of said support by means of a mechanism operating synchronically with a movement of said hooks in an advancement direction along said transport line; and means for transferring said supports;

wherein said transport line exhibits a straight horizontal tract and wherein said hooks are constrained to said chain by means of pivots exhibiting axes which are horizontal and perpendicular to the advancement direction of said chain;

said chain including a cardan chain including pairs of guide wheels arranged such that an axis of each pair thereof is perpendicular to an axis of a next pair thereof and such that axes of all pairs thereof are perpendicular to the advancement direction of said chain; said guide wheels being uniformly reciprocally distanced and extending in a longitudinal direction alone said chain, as are also said hooks;

wherein the second reciprocal distance at which said first plier and said second plier are placed is not less than a mass of any one of said hooks measured in the advancement direction thereof, and wherein said first plier and said second plier include symmetrically-opening arms provided with recesses shaped such as to be able to embrace the ends of said supports; said arms having fulcra situated above said transport line.

2. An apparatus for hanging objects in an orderly fashion, especially sacked meats, on transferable supports, comprising:

a transport line along which fork-shaped hooks are guided, which hooks are consecutively constrained to a chain at a first predetermined reciprocal distance;

a tilting device for producing on command a partial tilting of said hooks from a natural loaded position, at which teeth of said hooks are positioned in such a way as to keep said object stably hung, into an unloading position, in which said teeth of said hooks are arranged inclinedly downwards such as to be unable to keep an object hooked thereon;

said tilting device being positionable on command at any point of a guide predisposed parallel to a tract of the transport line of the hooks;

a straight-rod support predisposed such that said objects can be hung thereon, the support having ends;

means for supporting said support at both ends thereof while keeping said support in a position which is parallel to and below said transport line of said hooks; said means for supporting comprising a first plier and a second plier situated and predisposed to operate at least at one end of said support, said first plier and said second plier being arranged at a second predetermined reciprocal distance and being commanded by a commanding means to alternatingly grip said at least one end of said support by means of a mechanism operating synchronically with a movement of said hooks in an advancement direction along said transport line; and means for transferring said supports;

wherein said transport line exhibits a straight horizontal tract and wherein said hooks are constrained to said chain by means of pivots exhibiting axes which are horizontal and perpendicular to the advancement direction of said chain;

said chain including a cardan chain including pairs of guide wheels arranged such that an axis of each pair thereof is perpendicular to an axis of a next pair thereof and such that axes of all pairs thereof are perpendicular to the advancement direction of said chain; said guide wheels being uniformly reciprocally distanced and extending in a longitudinal direction along said chain, as are also said hooks;

wherein said mechanism operating synchronically with the advancement of the hooks along the transport line comprises;

a rotating organ for moving said chain; a mechanical transmission transmitting rotation drive of said rotating organ and having a predetermined transmission ratio;

at least one cam, directly connected to said rotating organ by means of said mechanical transmission, which at least one cam commands said alternating activation of said first plier and said second plier in synchrony with said movement of said hooks in the advancement direction.

3. The apparatus of claim 2, wherein said cam commands the alternating activation of said first plier and said second plier in synchrony with said movement of said hooks by means of two rocker arm-con rod mechanisms, wherein each con rod is constrained by one end thereof to one arm of one of said first plier or said second plier.

4. The apparatus of claim 3, wherein for each of the first plier and the second plier both arms are pivoted about two fixed axes parallel to said advancement direction and are reciprocally constrained to rotate equally and in opposite direction by two cogwheels reciprocally enmeshing, one whereof is fixed to one of said arms and another whereof is fixed to another of said arms.

5. The apparatus of claim 4, wherein said con rods exhibit variable lengths on command, depending on a degree of aperture required of said arms.

6. The apparatus of claim 5, wherein said con rods are constituted by pneumatic cylinders.

7. An apparatus for hanging objects in an orderly fashion, especially sacked meats, on transferable supports, comprising:

a transport line along which fork-shaped hooks are guided, which hooks are consecutively constrained to a chain at a first predetermined reciprocal distance;

a tilting device for producing on command a partial tilting of said hooks from a natural loaded position, at which teeth of said hooks are positioned in such a way as to keep said object stably hung, into an unloading position, in which said teeth of said hooks are arranged inclinedly downwards such as to be unable to keep an object hooked thereon;

said tilting device being positionable on command at any point of a guide predisposed parallel to a tract of the transport line of the hooks;

a straight-rod support predisposed such that said objects can be hung thereon, the support having ends;

means for supporting said support at both ends thereof while keeping said support in a position which is parallel to and below said transport line of said hooks; said means for supporting comprising a first plier and a second plier situated and predisposed to operate at least at one end of said support, said first plier and said second plier being arranged at a second predetermined reciprocal distance and being commanded by a commanding means to alternatingly grip said at least one end of said support by means of a mechanism operating synchronically with a movement of said hooks in an advancement direction along said transport line; and means for transferring said supports;

wherein said transport line exhibits a straight horizontal tract and wherein said hooks are constrained to said chain by means of pivots exhibiting axes which are horizontal and perpendicular to the advancement direction of said chain;

said chain including a cardan chain including pairs of guide wheels arranged such that an axis of each pair thereof is perpendicular to an axis of a next pair thereof and such that axes of all pairs thereof are perpendicular to the advancement direction of said chain; said guide wheels being uniformly reciprocally distanced and extending in a longitudinal direction along said chain, as are also said hooks;

wherein said means for transferring said supports comprise:

a feeder of unloaded supports;

a first pair of chain transporters, one for each end of said supports and activated in synchrony and having disks associated to the relative chains of said chain transporters, which disks are predisposed consecutively such that the ends of a single one of the supports is restable in a cavity afforded between two consecutive disks;

each of said chain transporters being of a closed-ring type and exhibiting a frame rotatable in two directions about a fixed axis perpendicular to the transport direction between a horizontal work position and an inactive position whereat said chain transporters do not interfere with objects hanging from said hooks in transit along said transport line;

a second pair of chain transporters activated synchronically and each provided with disks associated to said chains of said second pair of chain transporters predisposed consecutively in such a way that the ends of the single supports when unloaded from said first pair of chain transporters can rest in cavities afforded between said two consecutive disks positioned consecutively;

said second pair of chain transporters being fixed and located on different vertical planes with respect to said first pair of chain transporters;

said second pair of chain transporters forming an extension of said first pair of chain transporters arranged in said horizontal work position;

each of said supports exhibiting at each end thereof two channels located at a reciprocal distance which is equal to a distance in normal direction to the advancement direction between said disks of a chain transporter of said first pair of chain transporters and said disks of a chain transporter of said second pair of chain transporters.

* * * * *